United States Patent

Schmid

[11] Patent Number: 5,680,842
[45] Date of Patent: Oct. 28, 1997

[54] METHOD OF CONTROLLING THE FUEL INJECTION IN A DIESEL ENGINE

[75] Inventor: Wolfram Schmid, Eislingen, Germany

[73] Assignee: Mercedes-Benz AG, Stuttgart, Germany

[21] Appl. No.: 708,658

[22] Filed: Sep. 5, 1996

[30] Foreign Application Priority Data

Sep. 21, 1995 [DE] Germany ............ 195 35 05.6

[51] Int. Cl.[6] ........................................... F02D 31/00
[52] U.S. Cl. ........................................ 123/357; 123/501
[58] Field of Search ........................ 123/357, 358, 123/359, 500, 501, 370, 371

[56] References Cited

U.S. PATENT DOCUMENTS

| | | |
|---|---|---|
| 4,346,688 | 8/1982 | Kaibara et al. |
| 4,601,270 | 7/1986 | Kimberley ............ 123/357 |
| 4,690,114 | 9/1987 | Weischedel . |
| 4,881,404 | 11/1989 | Siegel ................ 123/357 |
| 4,917,063 | 4/1990 | Hiraki ................ 123/357 |
| 4,926,636 | 5/1990 | Tadokoro ............. 123/357 |
| 5,036,815 | 8/1991 | Augustin ............. 123/357 |
| 5,067,461 | 11/1991 | Joachim .............. 123/357 |
| 5,111,789 | 5/1992 | Moriya ............... 123/357 |
| 5,207,198 | 5/1993 | Eisele ............... 123/357 |

FOREIGN PATENT DOCUMENTS

| | | |
|---|---|---|
| 0 278 990 | 2/1987 | European Pat. Off. . |
| 37 05 278 | 5/1988 | Germany . |
| 39 25 877 | 2/1991 | Germany . |

OTHER PUBLICATIONS

D. Seher, "Electronic Diesel Fuel Injection for the Improvement of Truck Emissions", ATZ–MTZ Sonderheft Motor und Umwelt, 1992, pp. 31–33.

Primary Examiner—Carl S. Miller
Attorney, Agent, or Firm—Klaus J. Bach

[57] ABSTRACT

In a method of controlling the fuel injection of a Diesel engine wherein injection parameters are adjusted depending on a group of input values including at least engine speed and desired engine torque, the injection timing and injection duration are adjusted by additionally using at least the time gradient of the desired engine torque among the fuel injection parameters.

2 Claims, 1 Drawing Sheet

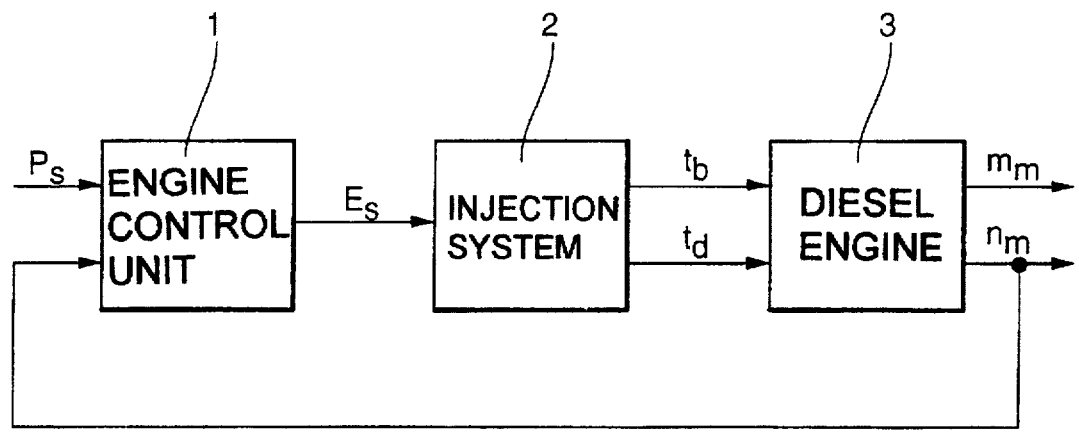

METHOD OF CONTROLLING THE FUEL INJECTION IN A DIESEL ENGINE

BACKGROUND OF THE INVENTION

The invention resides in a method of controlling the fuel injection in a Diesel engine wherein injection parameters are adjusted depending on a group of input values including at least desired engine speed and engine torque.

Such methods are performed today mostly by electronic engine management systems which provide corresponding control values to an injection system, for controlling the injection parameters particularly injection timing and injection duration. The expression control is used herein not only to designate the actual control processes but also control procedures or steps within overall control processes. For controlling the injection timing and the injection duration various externally and internally developed reference and control values are combined in the engine management systems to form an algorithm which is called injection strategy. The use of electronic engine management systems has, as compared with conventional mechanical engine control arrangements, the advantage that they permit greater freedom in the set-up of the injection strategy. One problem with the prior art mechanical injection arrangements is that they are optimized for a certain engine operating state but that they do not always provide optimal engine operation in other operating states.

The European patent publication EP 0 278 990 A1 discloses a method of controlling the fuel injection in a Diesel engine wherein injection timing, that is, the begin of the fuel injection, is moved by the injection controller of the injection pump first toward late injection timing when engine load is increased and the timing is then, with some delay, adjusted to the higher load operating state for which the fuel injection timing is moved toward early injection to adjust to the increased load state. A similar method wherein the injection timing is initially moved toward late injection timing and is then adjusted toward early injection timing appropriate for the increased engine load dependent on increasing engine speed or another value representative of engine acceleration is described in U.S. Pat. No. 4,346,688. The procedure described in this patent is to prevent increased noise when the amount of fuel injected and the engine load are increased. In this case the combustion process is delayed because the combustion chambers are still at the lower temperatures corresponding to the previous lower engine load.

German patent publication DE 37 05 278 A1 discloses a method to modulate the amount of fuel injected into an engine wherein positive threshold values are provided for the first derivation of an engine speed dependent signal, above which the amount of fuel injected is so modulated that oscillation of engine speed are prevented.

The German patent publications DE 39 25 877 A1 discloses a method of providing a signal indicative of the amount of fuel to be injected wherein, based on measured variables such as control pedal position, engine speed, lambda value, exhaust gas temperature or engine torque, a pedal position dependent reference value for a desired fuel injection amount is generated and, together with a second signal which is derived from an engine speed dependent preliminary performance graph and which is modified by a controller output signal to predetermined operating states, is utilized for a selection of the minimum amount of fuel to be injected. The values derived from the preliminary performance graph may depend on the air flow through the air intake pipe which in turn may be simulated by deriving it from the engine speed and the amount of fuel injected. The controller parameters may be influenced, among others, by the gradient of the lambda value when the derivation of engine speed exceeds a predetermined threshold value.

U.S. Pat. No. 4,690,114 discloses a speed control system for a Diesel engine wherein a reference value for the control of the fuel injection needed for a given desired engine speed depends, among other values, on a time gradient of the actual engine speed.

It is the object of the present invention to provide a method of controlling the fuel injection in a Diesel engine which results in improved engine operating behavior particularly during varying operating conditions.

SUMMARY OF THE INVENTION

In a method of controlling the fuel injection of a Diesel engine wherein injection parameters are adjusted depending on a group of input values including at least engine speed and desired engine torque, the injection timing and injection duration are adjusted by additionally using at least the time gradient of the desired engine torque among the fuel injection parameters.

For the injection strategy, the method according to the invention utilizes not only input values taken into account so far, such as engine speed, and desired engine torque, etc., but particularly the time gradients of those values. It has been found that an improved operating behavior can be achieved in this way, particularly during varying operating conditions such as during a load increase. If for the adjustment of injection timing and injection duration at least the time gradient of the engine speed is utilized, such adjustment may be directly dependent on the engine speed time gradient or there may be an indirect influence whereby the passing of threshold values changes the respective injection strategy depending on the gradient. A preferred embodiment of the invention is described below on the basis of the accompanying drawing.

BRIEF DESCRIPTION OF THE DRAWING

The sole Figure is a schematic diagram of a Diesel engine control system.

DESCRIPTION OF A PREFERRED EMBODIMENT

As shown in the Figure, a motor control unit 1, which is used as a central control unit of an electronic engine management system generates, depending on the input values operating pedal position (Ps) and engine speed (nm), the required injection information (Es) which is supplied by the engine control unit 1 to an injection system 2 of a Diesel engine 3. The injection system 2 selects the appropriate injection timing ($t_b$) and the appropriate injection duration ($t_d$) on the basis of the injection information (Es) for each operating stroke of the Diesel engine 3 in such a way that, as output, the desired engine speed and the desired engine torque are generated. As shown in the Figure, the information concerning the instantaneous engine speed ($n_m$) is returned to the input side of the engine control unit 1.

The engine control unit 1 determines the control strategy for the Diesel engine 3 by means of an injection strategy by which as logic reference values not only the engine speed ($n_m$) as an external reference value and the desired engine torque ($m_n$) as an internal reference valve as well as additional generally considered input values are utilized for forming an injection algorithm, but also their time gradients are employed as internal reference values that is especially the engine speed gradient and the desired engine torque gradient.

In a first embodiment, the engine speed gradient and the desired engine torque gradient are entered directly into a functional relation which determines the values of the injection parameters, that is the injection timing ($t_b$) and the injection duration ($t_d$) as function of the aforementioned logic reference values. Such functional interrelations are known per se and need not be described in detail as the expert can easily cause the gradient values to be taken into consideration at the appropriate place of the functional interrelation depending on a particular application.

In a second embodiment, predetermined or variable threshold values are defined by the respective gradients of the logic reference values for the injection strategy and, if the respective gradients pass the threshold values, actions for changing the injection strategy are taken for a predetermined or variable period. With this method, the gradients of the logic reference values known as such affect indirectly the injection parameters. The engine control unit 1 supplies the injection information (Es) for a suitable control of the Diesel engine injection system 2 to the engine control unit 1 depending on a selected procedure.

In this way, the operation of the Diesel engine 3 can be optimized on one hand for operation at a particular operating point or, on the other, it can be optimized also for variable operating conditions by means of the injection strategy utilizing at least the gradients of the engine speed ($m_m$) and of the desired engine torque while maintaining the conditions optimized for a particular operating point.

For example, with the injection strategy that takes the time gradients of engine speed and desired engine torque and possibly other values into consideration, the method according to the invention allows for the engine load to increase with a resulting positive engine speed gradient, that is, during vehicle acceleration when the engine load increases, the injection timing may be advanced for the respective engine speeds in contrast to the injection times that would be established with a strategy for engine operation at a particular operating point. Basically, this results in an improved operating efficiency of the engine because of improved fuel utilization and also in a reduction of the smoke emissions. During operation at a particular operating point, the advance of the injection timing will result in increased NOx emissions. However, for engine operation under variable conditions as it applies in the present case, the combustion chamber walls are, because of earlier lower power operation, relatively cool whereby NOx emission is sufficiently reduced that the advance of the injection timing can be permitted. Taking into consideration the time gradient of engine speed and desired torque values etc., consequently improves the operation of Diesel engines under variable operating conditions when compared with prior art Diesel engine control systems in which the engine control was based on the momentary engine operating point.

What is claimed is:

1. A method of controlling the fuel injection of a Diesel engine, wherein injection parameters are adjusted depending on a group of input values including at least engine speed and desired engine torque, and additionally depending on the time gradient of the desired engine torque, and wherein the time gradient of at least one of said desired engine torque and engine speed is employed to influence the level of threshold values passage of which causes a change in the setting for at least one of the injection timing and the injection duration to swith to a certain or to a variable time period.

2. In a method of controlling the fuel injection of a Diesel engine, wherein injection parameters are adjusted depending on a group of input values including at least engine speed and desired engine torque, and additionally depending on the time gradient of the desired engine torque and, for adjusting the injection timing and the injection duration, the time gradient of at least the engine speed is included in the parameters for controlling the fuel injection.

* * * * *